US011593272B2

(12) United States Patent
Jia et al.

(10) Patent No.: US 11,593,272 B2
(45) Date of Patent: Feb. 28, 2023

(54) METHOD, APPARATUS AND COMPUTER PROGRAM PRODUCT FOR MANAGING DATA ACCESS

(71) Applicant: EMC IP Holding Company LLC, Hopkinton, MA (US)

(72) Inventors: Ruiyong Jia, Beijing (CN); Jibing Dong, Beijing (CN); Baote Zhuo, Beijing (CN); Chun Ma, Beijing (CN); Jianbin Kang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 458 days.

(21) Appl. No.: 16/579,988

(22) Filed: Sep. 24, 2019

(65) Prior Publication Data

US 2020/0133875 A1 Apr. 30, 2020

(30) Foreign Application Priority Data

Oct. 31, 2018 (CN) ........................ 201811288676.X

(51) Int. Cl.
*G06F 12/10* (2016.01)
*G06F 12/0804* (2016.01)

(52) U.S. Cl.
CPC .......... *G06F 12/10* (2013.01); *G06F 12/0804* (2013.01); *G06F 2212/1041* (2013.01); *G06F 2212/608* (2013.01)

(58) Field of Classification Search
CPC ................. G06F 12/10; G06F 12/0804; G06F 2212/608; G06F 2212/1041
See application file for complete search history.

(56) References Cited

U.S. PATENT DOCUMENTS

| | | | | |
|---|---|---|---|---|
| 10,157,020 B1 | 12/2018 | Taylor et al. | | |
| 10,387,308 B2 | 8/2019 | Xu et al. | | |
| 10,761,989 B2 | 9/2020 | Gao et al. | | |
| 11,010,301 B2 | 5/2021 | Jia et al. | | |
| 11,269,776 B2 | 3/2022 | Chen | | |
| 2010/0325367 A1* | 12/2010 | Kornegay | G06F 12/0804 | 711/143 |
| 2014/0289473 A1* | 9/2014 | Hirao | G06F 12/0859 | 711/128 |

(Continued)

FOREIGN PATENT DOCUMENTS

| | | |
|---|---|---|
| CN | 101149704 | 3/2008 |
| CN | 101266580 | 9/2008 |
| CN | 101458665 | 6/2009 |

(Continued)

*Primary Examiner* — Baboucarr Faal
(74) *Attorney, Agent, or Firm* — BainwoodHuang

(57) ABSTRACT

In response to receiving a read request for target data, an external address of the target data is obtained from the read request, which is an address unmapped to a storage system; hit information of the target data in cache of the storage system is determined based on the external address; and based on the hit information, an address from the external address and an internal address for providing the target data is determined. The internal address is determined based on the external address and a mapping relationship. Therefore, it can shorten the data access path, accelerate the responding speed for the data access request, and allow the cache to prefetch the data more efficiently.

10 Claims, 8 Drawing Sheets

(56) References Cited

U.S. PATENT DOCUMENTS

2018/0285274 A1 10/2018 Teran et al.

FOREIGN PATENT DOCUMENTS

| | | |
|---|---|---|
| CN | 101840374 | 9/2010 |
| CN | 102207919 | 10/2011 |
| CN | 104346404 | 2/2015 |
| CN | 107870872 | 4/2018 |

* cited by examiner

METHOD, APPARATUS AND COMPUTER PROGRAM PRODUCT FOR MANAGING DATA ACCESS

CROSS-REFERENCE TO RELATED APPLICATION(S)

This application claims priority to Chinese Patent Application No. CN201811288676.X, on file at the China National Intellectual Property Administration (CNIPA), having a filing date of Oct. 31, 2018, and having "METHOD, APPARATUS AND COMPUTER PROGRAM PRODUCT FOR MANAGING DATA ACCESS" as a title, the contents and teachings of which are herein incorporated by reference in their entirety.

FIELD

Embodiments of the present disclosure generally relate to the field of data storage, and more specifically, to a method, a device and a computer program product for managing data access.

BACKGROUND

A computer storage system typically leverages a layered structure, i.e., it organizes data input/output (I/O) stacks with a layered driver model. In a storage system, a cache is often used to store data probably to be requested for in the future, so that response time of read requests for a host is shorter, i.e., a user may obtain target data more rapidly.

However, in a legacy storage system, a cache is typically located under a mapping layer, and this causes a longer I/O path of an operation for target data and increases latency of I/O response. Since the mapping layer maps the address of data, I/O mode may be altered, so that it is difficult to prefetch user data for a cache effectively. In addition, because the user data and metadata for storing an address mapping relationship have their own characteristics respectively, storing the two in the cache in a mixed way makes it difficult to apply respective management algorithms for these characteristics, thereby reducing the efficiency of the cache.

SUMMARY

Embodiments of the present disclosure provide a method, a device and a computer program product for managing data access.

In a first aspect of the present disclosure, there is provided a method of managing data access, including: in response to receiving a read request for target data, obtaining an external address of the target data from the read request, the external address being an address unmapped to a storage system; determining, based on the external address, hit information of the target data in a cache of the storage system; and determining, based on the hit information, an address from the external address and an internal address for providing the target data, the internal address is determined based on the external address and a mapping relationship.

In a second aspect of the present disclosure, there is provided a method of managing data access, including: in response to receiving a write request for target data, obtaining the target data and an external address of the target data from the write request, the external address being an address unmapped to a storage system; storing the target data in association with the external address into a cache in the storage system; and in response to a cache flush request for the cache, determining a mapping relationship for mapping the external address to an internal address of the storage system; determining, based on the external address and the mapping relationship, the internal address for storing data in the cache into a memory of the storage system; and storing the data into the memory of the storage system, based on the internal address.

In a third aspect of the present disclosure, there is provided a device of managing data access, including at least one processing unit and at least one memory. The at least one memory is coupled to the at least processing unit and stores instructions executable by the at least one processing unit. The instructions, when executed by the at least one processing unit, causes the device to perform acts including: in response to receiving a read request for target data, obtaining an external address of the target data from the read request, the external address being an address unmapped to a storage system; determining, based on the external address, hit information of the target data in a cache of the storage system; and determining, based on the hit information, an address from the external address and an internal address for providing the target data, the internal address is determined based on the external address and a mapping relationship.

In a fourth aspect of the present disclosure, there is provided a device of managing data access, including at least one processing unit and at least one memory. The at least one memory is coupled to the at least processing unit and stores instructions executable by the at least one processing unit. The instruction, when executed by the at least one processing unit, causes the device to perform acts including: in response to receiving a write request for target data, obtaining the target data and an external address of the target data from the write request, the external address being an address unmapped to a storage system; storing the target data in association with the external address into a cache in the storage system; and in response to a cache flush request for the cache, determining a mapping relationship for mapping the external address to an internal address of the storage system; determining, based on the external address and the mapping relationship, the internal address for storing data in the cache into a memory of the storage system; and storing the data into the memory of the storage system, based on the internal address.

In a fifth aspect of the present disclosure, there is provided a computer program product. The computer program product is tangibly stored on a non-transient computer readable medium and includes machine executable instructions which, when executed, causes a machine to perform any step of the method according to the first aspect of the present disclosure.

In a sixth aspect of the present disclosure, there is provided a computer program product. The computer program product is tangibly stored on a non-transient computer readable medium and includes machine executable instructions which, when executed, causes a machine to perform any step of the method according to the second aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of the present disclosure will become more apparent, through the following detailed description of the example embodiments of the present disclosure with reference to the accompanying drawings, in which the same reference symbols generally refer to the same elements.

DETAILED DESCRIPTION OF EMBODIMENTS

Figure 1:
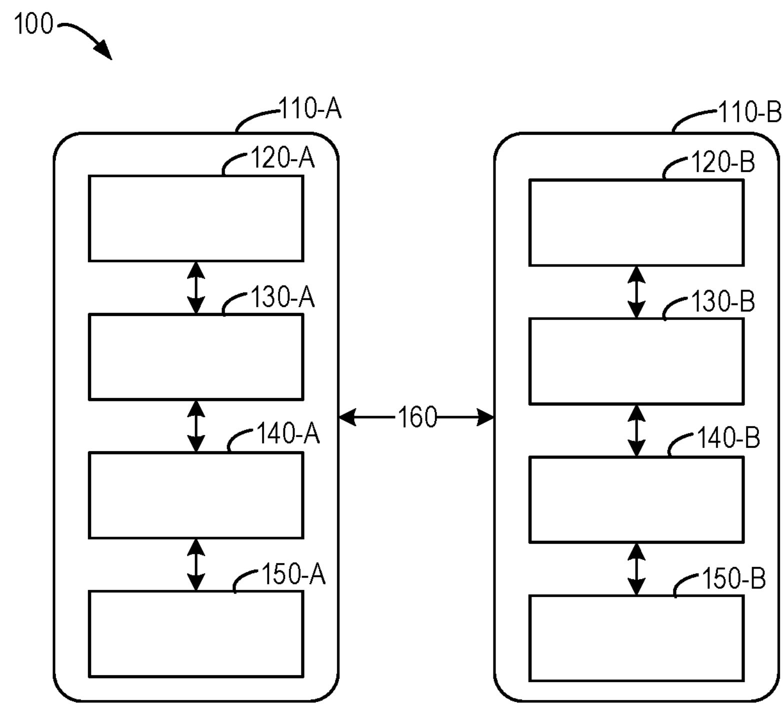
FIG. 1 illustrates a schematic diagram of an architecture of a legacy storage system.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will now be described in detail with reference to the accompanying drawings. Although preferred embodiments of the present disclosure are illustrated in the drawings, it would be appreciated that the present disclosure may be implemented in various manners but should not be construed as being limited by the embodiments illustrated herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another embodiment." The terms "first," "second," and the like may refer to different or the same objects. Other definitions, either explicit or implicit, may be included below.

FIG. 1 illustrates a schematic diagram of architecture of a legacy storage system 100. It would be appreciated that the structure and functionality of the storage system 100 as shown in FIG. 1 are provided only as an example, and there may be other possible implementations.

As shown, the storage system includes therein storage processors 110-A and 110-B which are collectively referred to as storage processors 110. The storage processors 110-A and 110-B respectively include: host objects 120-A and 120-B (which are collectively referred to as host objects 120), mapping layers 130-A and 130-B (which are collectively referred to as mapping layers 130), caches 140-A and 140-B (which are collectively referred to as caches 140), and memories 150-A and 150-B (which are collectively referred to as memories 150). It would be appreciated that, although a limited number of components, e.g., two storage processors, is shown in the drawing, more or fewer components of the same type may be included.

By using a plurality of storage processors 110, and in combination with the cache mirroring technique, data availability when a single storage processor 110 fails can be ensured. Between the storage processors 110 may be provided, for example, with a Clariion message interface (CMI) channel 160 for communication between the storage processors 110, and mirroring data written into the cache 140.

The host object 120 may be a small computer system interface (SCSI) object. The cache 140 may be a multi-core cache for providing a better performance. The cache 140 is generally implemented as dynamic random access memory (DRAM). The memory 150 may be a logical memory. The logical memory is a virtual device for providing a region for providing available storage capacity on one or more physical memories. Logical unit numbers (LUNs) may be used to identify storage units in the memory 150.

The mapping layer 130 may export thin provisioning LUNs (TLUs) to a user, using a thin provisioning technique. The thin provisioning technique allows a user to allocate a sufficiently large virtual capacity to an application, in the case that the actual capacity is small. The actual capacity is occupied only when data write occurs. Through dynamic capacity allocation of the system, the thin provisioning technique can improve the storage utilization remarkably. The thin provisioning also simplifies the capacity planning and task management greatly. It would be appreciated that, although the mapping layer 130 utilizes the thin provisioning technique herein, it is provided only as an example, and other provisioning techniques are feasible, for example, thick provisioning.

Figure 2:
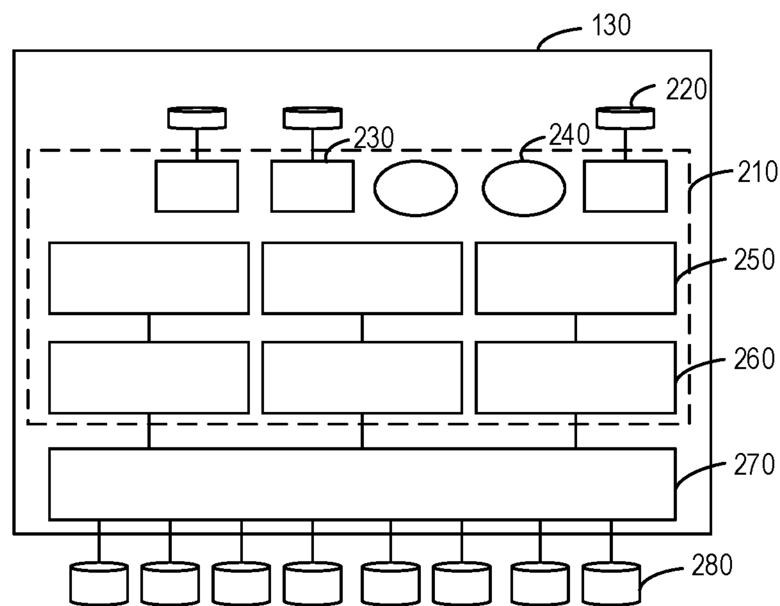
FIG. 2 illustrates a schematic diagram of an internal structure of a mapping layer in a legacy storage system based on thin provisioning.

Further, FIG. 2 illustrates a schematic diagram of an internal structure of a mapping layer 130 based on thin provisioning in the legacy storage system 100. It would be appreciated that the structure and functionality of the internal structure of the mapping layer 130 as shown in FIG. 2 are provided only as an example, and there may be other possible implementations.

From top to bottom, the mapping layer 130 includes: a TLU 220 (which is also referred to an external address 220 herein), a file 230, a snapshot 240, a file system 250, a sparse volume 260, a slice pool 270 and a LUN 280 (which is also referred to as an internal address 280 herein). In general, the mapping layer 130 manages mapping between the TLU 220 and the LUN 280. More specifically, the mapping layer 130 implements mapping twice: maintaining the a mapping between TLU 220 and the address space of the sparse volume 260 using a common block file system (CBFS) 210, and maintaining a mapping between the address space of the sparse volume 260 and the LUN 280 using the sparse volume 260.

The allocation units in the file system 250 each have a fixed size, for example, 8 KB. The LUN 280 is probably unable to fully support the address space of the sparse volume 260. The LUN 280 is divided into, for example, slices of 256 MB, which are arranged into the slice pool 270, and these slices maybe added dynamically into the sparse volume 260. The data sizes listed above are provided only as an example, without limiting the scope of the present disclosure.

In the current storage system 100, the cache 140 is located between the mapping layer 130 and the memory 150 (as shown in FIG. 1), for storing user data and metadata may be requested for. For the technical solution, a data access request of a user has to be processed in two stages. The first stage is to obtain or create a mapping between TLU 220 and LUN 280, and the second stage is to access data according to the LUN 280, for example, read data or write data. Hence, there is a relatively long data access path. In addition, due to the mapping between the TLU 220 and the LUN 280, the user data written continuously may be mapped to a discontinuous LUN 280, this further lengthens the data access path, and increases the latency of response.

The mapping layer 130 may disturb the data access mode, for example, dividing a read operation for bulk data into several discontinuous sub-read operations. Hence, it is difficult for the cache 140 to detect the data access mode, and fail to perform data prefetching effectively. Moreover, both the user data and the metadata for storing an address mapping relationship are stored in the cache 140, but it is difficult for the cache 140 to apply respective management algorithms according to characteristics of the two types of data, thereby reducing the efficiency of management algorithms.

Figure 3:
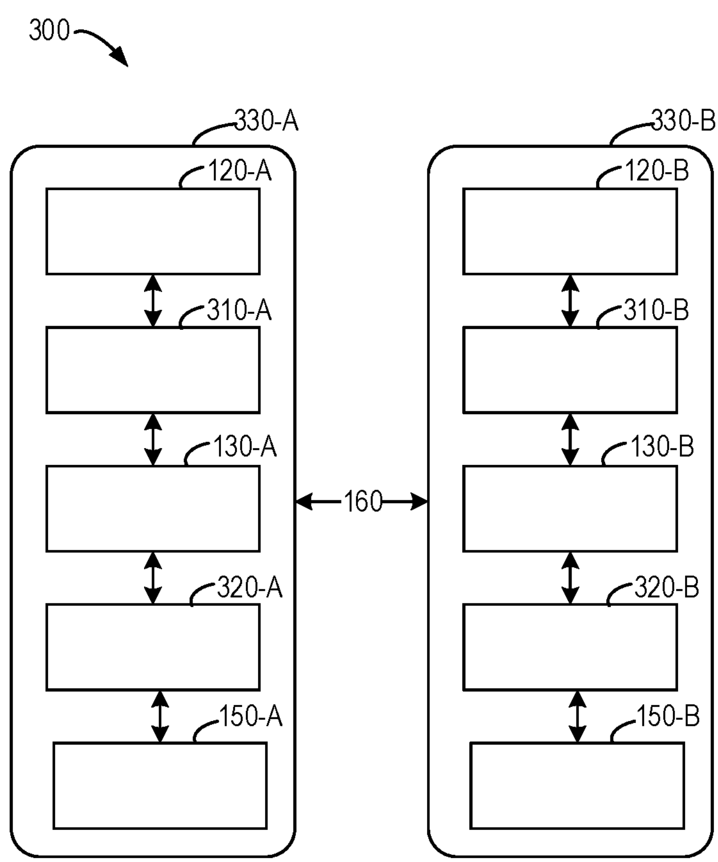
FIG. 3 illustrates a schematic diagram of an architecture of a storage system that can implement an embodiment of the present disclosure.

The embodiments of the present disclosure provide a solution of managing data access. FIG. 3 illustrates a schematic diagram of architecture of a storage system 300 according to an embodiment of the present disclosure. It would be appreciated that the structure and functionality of the storage system 300 as shown in FIG. 3 are provided only for illustration, without implying any limitation to the scope of the present disclosure. The embodiments of the present disclosure may be implemented in different structures and/or architecture.

Similar to the storage system 100 as shown in FIG. 1, the storage system 300 includes a storage processor 330 which includes: a host object 120, a mapping layer 130 and a memory 150. A difference over the storage system 100 lies in that, in the storage system 300, the caches 140-A and 140-B in FIG. 1 are layered, to form caches 310-A and 310-B (which are collectively referred to as caches 310) for storing user data, and caches 320-A and 320-B (which are collectively referred to as caches 320) for storing metadata, respectively. Both the caches 310 and 320 may be operated in a mirroring mode and a write-back/write-through mode.

According to the embodiment of the present disclosure, the cache 310 is disposed above the mapping layer 130, and hence, data access requests from a user is not necessarily to be performed in two stages, and for example, in a case of read hit and data write, the address mapping may be omitted, thereby saving the overhead caused by the mapping layer 130, shortening the data access path, accelerating the response speed for the access request, and thus enhancing user experience. Besides, the cache 310 may detect the data access mode effectively, thereby perform the data prefetching effectively. This further shortens the response time. In addition, by dividing the cache into the cache 310 for storing user data and the cache 320 for storing metadata, the cache may apply management algorithms in light of the characteristics of the user data and the metadata, respectively, thereby implementing more effective management.

Figure 4:
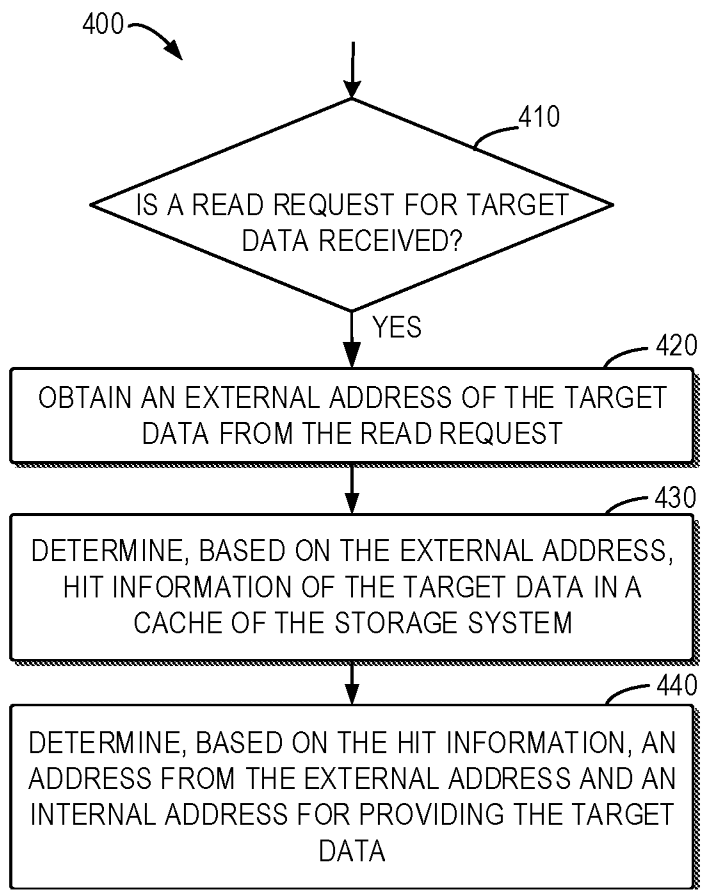
FIG. 4 illustrates a flowchart of a method of managing data access according to an embodiment of the present disclosure.

FIG. 4 illustrates a flowchart of a method 400 of managing data access according to an embodiment of the present disclosure. For example, the method 400 may be performed by the storage processor 330 as shown in FIG. 3. Acts involved in the method 400 will be described below with reference to FIG. 3. It would be appreciated that the method 400 may also include additional acts not shown and/or skip acts as shown, and the scope of the present disclosure is not limited in this aspect.

At block 410, the storage processor 330 determines whether a read request for target data is received. If the read request for the target data is received, at block 420, the storage processor 330 obtains the external address 220 of the target data from the read request, the external address 220 is an address unmapped to the storage system 300. At block 430, the storage processor 330 determines, based on the external address 220, hit information of the target data in the cache 310 of the storage system 300. At block 440, based on the hit information, the storage processor 330 determines an address from the external address 220 and the internal address 280 for providing the target data which is determined based on the external address 220 and a mapping relationship.

Figure 5A:
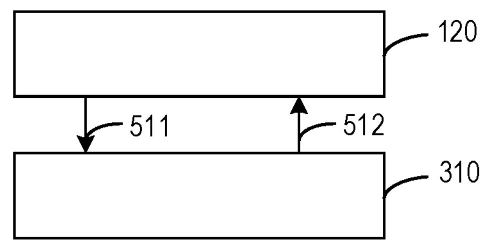
FIGS. 5A and 5B illustrate diagrams of performing a read hit operation in the storage system as shown in FIGS. 3 and 1, respectively.

According to some embodiments, if the hit information indicates a hit on the target data, i.e., the storage processor 330 detects that there are target data in the cache 310, and then the storage processor 330 determines the external address 220 as the address for providing the target data. According to some embodiments, the memory processor 330 provides, based on the external address 220 the target data from the cache 310 for the read request. FIG. 5A illustrates a schematic diagram of performing a read hit operation in the storage system 300 as shown in FIG. 3.

Path 511: a read request based on the external address 220 is transferred from the host object 120 to the cache 310; and Path 512: the target data is transferred from the cache 310 to the host object 120.

Figure 5B:
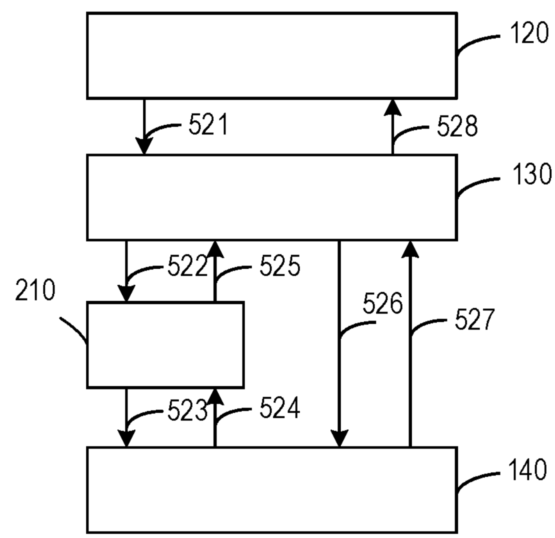

In comparison, FIG. 5B illustrates a diagram of performing a read hit operation in the storage system 100 as shown in FIG. 1.

Path 521: a read request based on the external address 220 is transferred from the host object 120 to the mapping layer 130;

Path 522: the mapping layer 130 queries the mapping relationship from the CBFS 210;

Path 523: the CBFS 210 reads metadata associated with the mapping relationship from the cache 140;

Path 524: the cache 140 transfers the mapping relationship to the CBFS 210;

Path 525: the CBFS 210 transfers the mapping relationship to the mapping layer 130;

Path 526: the read request based on the internal address 280 is transferred from the mapping layer 130 to the cache 140;

Path 527: the cache 140 transfers the target data to the mapping layer 130; and Path 528: the mapping layer 130 transfers the target data to the host object 120.

It can be seen from the above description that, in the case of read hit, as compared to a conventional storage system, the storage system according to the embodiments of the present disclosure may implement a remarkably shorter data access path, thereby shortening the response time.

According to some embodiments, if the hit information indicates that the target data is missed, i.e., the storage processor 330 detects that the target data dose not existed in the cache 310, the storage processor 330 determines the internal address 280 based on the external address 220 and the mapping relationship, and determines the internal address 280 as the address for providing the target data.

Figure 6A:
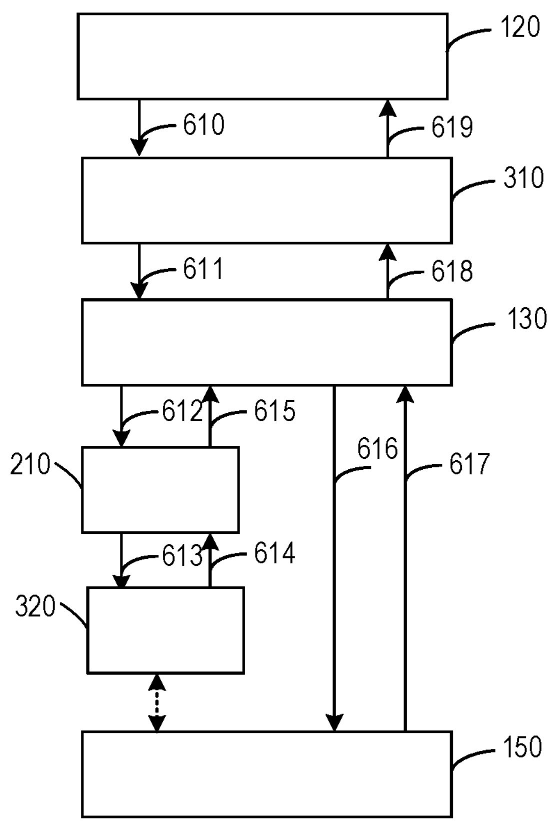
FIGS. 6A and 6B illustrate schematic diagrams of performing a read missing operation in the storage system as shown in FIGS. 3 and 1, respectively.

According to some embodiments, the storage processor 330 obtains the target data from the memory 150 of the storage system 300, based on the internal address 280, and the storage processor 330 stores the target data in association with the external address 220 into the cache 310; and the storage processor 330 provides, based on the external address 220, the target data from the cache 310 for the read request. FIG. 6A illustrates a schematic diagram of performing a read missing operation in the storage system 300 as shown in FIG. 3.

Path 610: a read request based on the external address 220 is transferred from the host object 120 to the cache 310;

Path 611: the read request based on the external address 220 is transferred from the cache 310 to the mapping layer 130;

Path 612: the mapping layer 130 queries the mapping relationship from the CBFS 210;

Path 613: based on whether the metadata is hit or not, the CBFS 210 reads the metadata associated with the mapping relationship from the cache 320 or the memory 150;

Path 614: the cache 320 transfers the mapping relationship to the CBFS 210;

Path 615: the CBFS 210 transfers the mapping relationship to the mapping layer 130;

Path 616: the read request based on the internal address 280 is transferred from the mapping layer 130 to the memory 150;

Path 617: the memory 150 transfers the target data to the mapping layer 130;

Path 618: the mapping layer 130 transfers the target data to the cache 310; and Path 619: the cache 310 transfers the target data to the host object 120.

In the above embodiment, the cache 320 for storing metadata is provided, such that the mapping relationship can be obtained more rapidly in the case that the metadata is hit, thus obtaining the target data more rapidly.

Figure 6B:
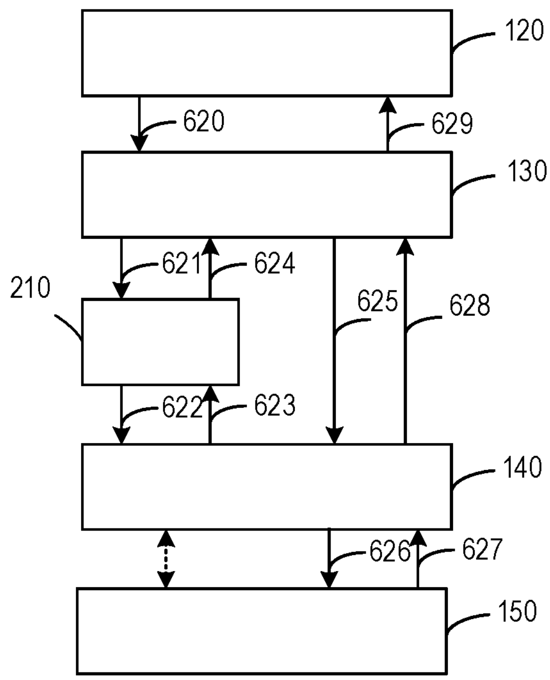

FIG. 6B illustrates of executing a read missing operation in the storage system 100 as shown in FIG. 1.

Path 620: a read request based on the external address 220 is transferred from the host object 120 to the mapping layer 130;

Path 621: the mapping layer 130 queries the mapping relationship from the CBFS 210;

Path 622: based on whether the metadata is hit or not, the CBFS 210 reads the metadata associated with the mapping relationship from the cache 140 or the memory 150;

Path 623: the cache 140 transfers the mapping relationship to the CBFS 210;

Path 624: the CBFS 210 transfers the mapping relationship to the mapping layer 130;

Path 625: the read request based on the internal address 280 is transferred from the mapping layer 130 to the cache 140;

Path 626: the read request based on the internal address 280 is transferred from the mapping layer 130 to the memory 150;

Path 627: the memory 150 transfers the target data to the cache 140;

Path 628: the cache 140 transfers the target data to the mapping layer 130; and Path 629: the mapping layer 130 transfers the target data to the host object 120.

It can be seen from the above description that, in the case of read missing, the lengths of data access path are the same in the storage systems as shown in FIG. 1 and FIG. 3.

Figure 7:
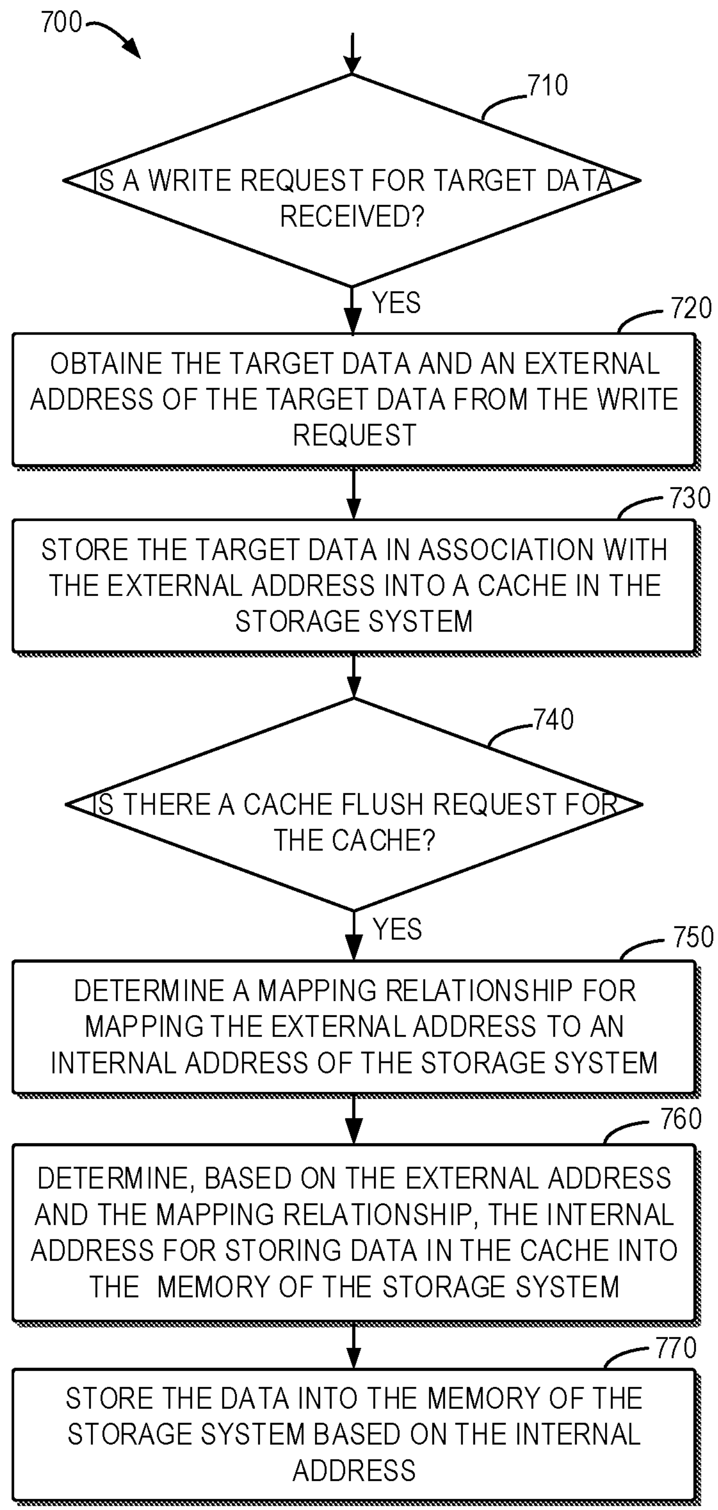
FIG. 7 illustrates a flowchart of a method of managing data access according to an embodiment of the present disclosure.

FIG. 7 illustrates a flowchart of a method 700 of managing data access according to an embodiment of the present disclosure. For example, the method 700 may be performed, for example, by the storage processor 330 as shown in FIG. 3. Acts involved in the method 700 will be described below with reference to FIG. 3. It would be appreciated that the method 700 may also include additional acts not shown and/or skip the acts as shown, and the scope of the present disclosure is not limited in this aspect.

At block 710, the storage processor 330 determines whether a write request for the target data is received. If the write request for the target data is received, at block 720, the storage processor 330 obtains the target data and the external address 220 of the target data from the write request, and the external address 220 is an address unmapped to the storage system 300. At block 730, the storage processor 330 stores the target data in association with the external address 220 into the cache 310 of the storage system 300.

At block 740, the storage processor 330 determines whether there is a cache flush request for the cache 310. If the storage processor 330 determines that there is a cache flush request for the cache 310, at block 750, the storage processor 330 determines a mapping relationship for mapping the external address 220 as the internal address 280 of the storage system 300. At block 760, the internal address 280 for storing the data in the cache into the memory of the storage system is determined based on the external address 220 and the mapping relationship. At block 770, the storage processor 330 stores the data into the memory 150 of the storage system, based on the internal address 280.

Figure 8A:
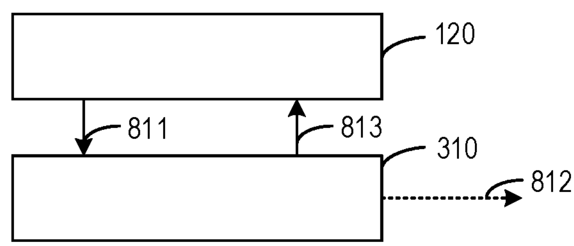
FIGS. 8A and 8B illustrate diagrams of performing a write operation in the storage systems as shown in FIGS. 3 and 1, respectively.
Figure 9:
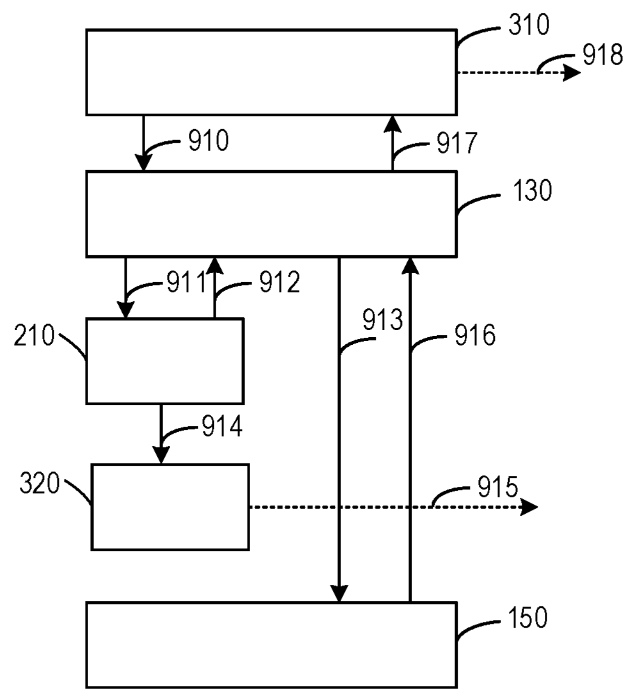
FIG. 9 illustrates a diagram of performing a cache flush operation in the storage system as shown in FIG. 3.

FIG. 8A illustrates a schematic diagram of performing a write operation in the storage system 300 as shown in FIG. 3, and FIG. 9 illustrates a schematic diagram of performing a cache flush operation. As shown in FIG. 8A:

Path 811: a write request is transferred from the host object 120 to the cache 310;

Path 812: the target data for the write request is mirrored to a cache for user data in a further memory processor in the storage system 300;

Path 813: the cache 310 notifies the host object 120 of completion of the write operation.

Path 812 is optional, which is adapted to the case that there is a plurality of storage processors 330. Upon completion of the write operation, the data written into the cache 310 are identified as dirty data. These dirty data are flushed to the memory 150 based on a least recently used (LRU) algorithm. After flushing, the status of the data is changed from “dirty” to “clean.” In addition, the cache 320 may also manage the metadata therein using the LRU algorithm. The present disclosure is not limited in terms of the management algorithm.

Figure 8B:
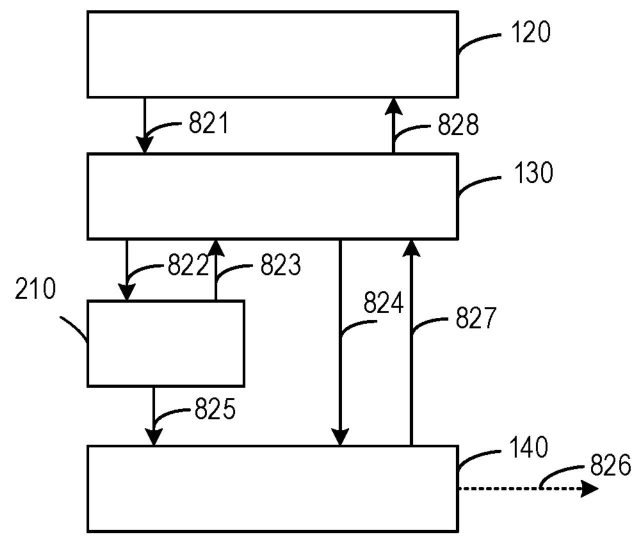

In comparison, FIG. 8B illustrates a schematic diagram of performing a write operation in the storage system 100 as shown in FIG. 1. Assuming that data is to be written into a new region in the memory (i.e., not the case of overwriting):

Path 821: a write request based on the external address 220 is transferred from the host object 120 to the mapping layer 130;

Path 822: the mapping layer 130 queries a mapping relationship from the CBFS 210;

Path 823: the CBFS 210 creates the mapping relationship and transfers the mapping relationship to the mapping layer 130;

Path 824: the mapping layer 130 transfers the target data to the cache 140, based on the internal address 280 obtained according to the mapping relationship;

Path 825: the CBFS 210 transfers the mapping relationship to the cache 140;

Path 826: the target data for the write request and the metadata associated with the mapping relationship are mirrored to a cache in a further storage processor of the storage system 100;

Path 827: the cache 140 notifies the mapping layer 130 of completion of the write operation;

Path 828: the mapping layer 130 notifies the host object 120 of completion of the write operation.

Path 826 is optional, which is adapted to the case that there is a plurality of storage processors 110. It can be seen from the above description that, in a case of writing data, as compared to a conventional storage system, the storage system according to the embodiments of the present disclosure can implement a remarkably shorter data access path, thereby shortening response time. In addition, in the conventional storage system, the mapping relationship must be created prior to completion of write, thereby decelerating response speed.

The operation of performing cache flush in the storage system 300 as shown in FIG. 3 is shown in FIG. 9, and similarly, assuming that overwriting is not involved:

Path 910: the cache 310 flushes data to the mapping layer 130;

Path 911: the mapping layer 130 queries the mapping relationship from the CBFS 210;

Path 912: the CBFS 210 creates the mapping relationship and transfers the mapping relationship to the mapping layer 130;

Path 913: the mapping layer 130 transfers the target data to the memory 150, based on the internal address 280 obtained according to the mapping relationship;

Path 914: the CBFS 210 transfers the mapping relationship to the cache 320;

Path 915: the metadata associated with the mapping relationship is mirrored to a cache for metadata in a further storage processor of the storage system 300;

Path 916: the memory 150 notifies the mapping layer 130 of completion of the cache flush operation;

Path 917: the mapping layer 130 notifies the cache 310 of completion of the cache flush operation;

Path 918: the status of the data in the cache 310 is updated to "clean", and the status is mirrored to a cache for user data in a further storage processor of the storage system 300.

Paths 915 and 918 are optional, which are adapted for the case that there is a plurality of storage processors 330. In the embodiment of the present disclosure, the cache flush requires late binding, i.e., creating a relationship between the external address 220 and the internal address 280.

In contrast, in the storage system 100 as shown in FIG. 1, the cache 140 can directly flush the data to the memory 150, without requiring address mapping. However, the cache flush operation which is a background operation is not performed over the I/O path, and thus does not affect response speed.

As can be seen from the above description, the technical solution according to the present disclosure shortens the data access path, accelerates the response speed for an access request, and thus enhances user experience. Moreover, the technical solution according to the present disclosure can detect the data access mode effectively, thereby perform data prefetching effectively. This further shortens the response time. In addition, the technical solution according to the present disclosure can apply management algorithms for caches according to characteristics of user data and metadata respectively, thus implementing more efficient management.

Figure 10:
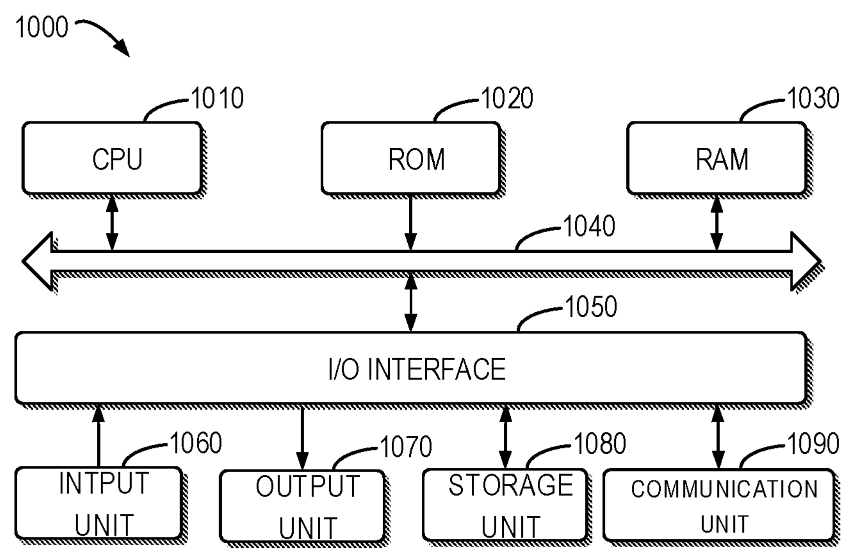
FIG. 10 illustrates a schematic block diagram of an example device that can be used to implement the embodiments of the present disclosure.

FIG. 10 illustrates a schematic block diagram of an example device 1000 that may be used to implement an embodiment of the present disclosure. As shown, the device 1000 includes a central processing unit (CPU) 1010 which performs various appropriate acts and processing, based on a computer program instruction stored in a read-only memory (ROM) 1020 or a computer program instruction loaded from a storage unit 1080 to a random access memory (RAM) 1030. Various programs and data required for operations of the device 1000 may be stored in the RAM 1030. The CPU 1010, the ROM 1020 and the RAM 1030 are connected via a bus 1040 with one another. An input/output (I/O) interface 1050 is also connected to the bus 1040.

A plurality of components in the device 1000 are connected to the I/O interface 1050: including an input unit 1060 e.g., a keyboard, a mouse, etc.; an output unit 1070 e.g., various kinds of displays and a loudspeaker, etc.; a storage unit 1080, e.g., a magnetic disk, an optical disk, etc.; and a communication unit 1090, e.g., a network card, a modem, and a wireless communication transceiver, etc. The communication unit 1090 allows the device 1000 to exchange information/data with other devices through a computer network such as an Internet and/or various kinds of telecommunications networks.

Various processes and processing described above, e.g., the method 400 or 700, may be executed by the processing unit 1010. For example, in some embodiments, the method 400 or 700 may be implemented as a computer software program that is tangibly included in a machine readable medium, e.g., the storage unit 1080. In some embodiments, part or all of the computer programs may be loaded and/or mounted onto the device 1000 via the ROM 1020 and/or the communication unit 1090. When the computer program is loaded to the RAM 1030 and executed by the CPU 1010, one or more acts of the method 400 or 700 as described above may be executed.

The present disclosure may be a method, an apparatus, a system, and/or a computer program product. The computer program product may include a computer readable storage medium having computer readable program instructions thereon for causing a processor to carry out aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals sent through a wire.

Computer readable program instructions described herein may be downloaded to individual computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, by means of state information of the computer readable program instructions, an electronic circuitry including, for example, programmable logic circuitry, field-programmable gate arrays (FPGA), or programmable logic arrays (PLA) can be personalized to execute the computer readable program instructions, thereby implementing various aspects of the present disclosure.

Aspects of the present disclosure are described herein with reference to flowchart and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which are executed via the processor of the computer or other programmable data processing apparatus, create means (or specialized circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which are executed on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of codes, which includes one or more executable instructions for implementing the specified logical function(s). In some alternative implementations, the functions noted in the block may be implemented in an order different from those illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

The descriptions of the various embodiments of the present disclosure have been presented for illustration purposes, but are not intended to be exhaustive or limited to the embodiments disclosed. Many modifications and variations will be apparent to those of skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing data access, comprising:

in response to receiving a read request for target data, obtaining an external address of the target data from the read request, the external address being an address unmapped to a storage system, the storage system including a first cache, a second cache, and a mapping layer of a data input/output (I/O) stack, the mapping layer managing a mapping relationship between the external address and an internal address of the storage system;

determining, based on the external address, hit information of the target data in the first cache of the storage system, the first cache storing user data, the first cache being disposed above the mapping layer of the data I/O stack;

determining, based on the hit information, an address from the external address and the internal address for providing the target data, the internal address being determined based on the external address and the mapping relationship, the second cache storing metadata associated with the mapping relationship, the second cache being located between the mapping layer of the data I/O stack and a memory of the storage system, wherein determining the address for providing the target data comprises, in response to the hit information indicating a hit on the target data, determining the external address as an address for providing the target address; and providing, based on the external address, the target data from the first cache for the read request.

2. The method of claim 1, wherein determining the address for providing the target data comprises:

in response to the hit information indicating that the target data is missed, determining the internal address based on the external address and the mapping relationship; and determining the internal address as the address for providing the target data.

3. The method of claim 2, further comprises:

obtaining the target data from the memory of the storage system based on the internal address;

storing the target data in association with the external address into the first cache; and providing, based on the external address, the target data from the first cache for the read request.

4. A method of managing data access, comprising:

in response to receiving a write request for target data, obtaining the target data and an external address of the target data from the write request, the external address being an address unmapped to a storage system, the storage system including a first cache, a second cache, and a mapping layer of a data input/output (I/O) stack, the mapping layer managing a mapping relationship between the external address and an internal address of the storage system;

storing the target data in association with the external address into the first cache in the storage system, the first cache storing user data, the first cache being disposed above the mapping layer of the data I/O stack; and in response to a cache flush request for the first cache, determining the mapping relationship for mapping the external address to the internal address of the storage system, the second cache storing metadata associated with the mapping relationship, the second cache being located between the mapping layer of the data I/O stack and a memory of the storage system;

determining, based on the external address and the mapping relationship, the internal address for storing data in the first cache into a memory of the storage system; and storing the data into the memory of the storage system based on the internal address.

5. A device for managing data access, comprising:

at least one processing unit; and at least one memory coupled to the at least one processing unit and storing instructions executable by the at least one processing unit, the instructions, when executed by the at least one processing unit, causing the device to perform acts comprising:

in response to receiving a read request for target data, obtaining an external address of the target data from the read request, the external address being an address unmapped to a storage system, the storage system including a first cache, a second cache, and a mapping layer of a data input/output (I/O) stack, the mapping layer managing a mapping relationship between the external address and an internal address of the storage system;

determining, based on the external address, hit information of the target data in the first cache of the storage system, the first cache storing user data, the first cache being disposed above the mapping layer of the data I/O stack;

determining, based on the hit information, an address from the external address and the internal address for providing the target data, the internal address being determined based on the external address and the mapping relationship, the second cache storing metadata associated with the mapping relationship, the second cache being located between the mapping layer of the data I/O stack and a memory of the storage system, wherein determining the address for providing the target data comprises, in response to the hit information indicating a hit on the target data, determining the external address as an address for providing the target address; and providing, based on the external address, the target data from the first cache for the read request.

6. The device of claim 5, wherein determining the address for providing the target data comprises:

in response to the hit information indicating that the target data is missed, determining the internal address based on the external address and the mapping relationship; and determining the internal address as the address for providing the target data.

7. The device of claim 6, further comprises:

obtaining the target data from the memory of the storage system based on the internal address;

storing the target data in association with the external address into the first cache; and providing, based on the external address, the target data from the first cache for the read request.

8. A device for managing data access, comprising:

at least one processing unit; and at least one memory coupled to the at least one processing unit and storing instructions executable by the at least one processing unit, the instructions, when executed by the at least one processing unit, causing the device to perform acts comprising:

in response to receiving a write request for target data, obtaining the target data and an external address of the target data from the write request, the external address being an address unmapped to a storage system, the storage system including a first cache, a second cache, and a mapping layer of a data input/output (I/O) stack, the mapping layer managing a mapping relationship between the external address and an internal address of the storage system;

storing the target data in association with the external address into the first cache in the storage system, the first cache storing user data, the first cache being disposed above the mapping layer of the data I/O stack; and in response to a cache flush request for the first cache, determining the mapping relationship for mapping the external address to the internal address of the storage system, the second cache storing metadata associated with the mapping relationship, the second cache being located between the mapping layer of the data I/O stack and a memory of the storage system;

determining, based on the external address and the mapping relationship, the internal address for storing data in the first cache into a memory of the storage system; and storing the data into the memory of the storage system based on the internal address.

9. A computer program product having a non-transitory computer readable medium which stores a set of instructions to manage data access; the set of instructions, when carried out by computerized circuitry, causing the computerized circuitry to perform a method of:

in response to receiving a read request for target data, obtaining an external address of the target data from the read request, the external address being an address unmapped to a storage system, the storage system including a first cache, a second cache, and a mapping layer of a data input/output (I/O) stack, the mapping layer managing a mapping relationship between the external address and an internal address of the storage system;

determining, based on the external address, hit information of the target data in the first cache of the storage system, the first cache storing user data, the first cache being disposed above the mapping layer of the data I/O stack;

determining, based on the hit information, an address from the external address and the internal address for providing the target data, the internal address being determined based on the external address and the mapping relationship, the second cache storing metadata associated with the mapping relationship, the second cache being located between the mapping layer of the data I/O stack and a memory of the storage system, wherein determining the address for providing the target data comprises, in response to the hit information indicating a hit on the target data, determining the external address as an address for providing the target address; and providing, based on the external address, the target data from the first cache for the read request.

10. A computer program product having a non-transitory computer readable medium which stores a set of instructions to manage data access; the set of instructions, when carried out by computerized circuitry, causing the computerized circuitry to perform a method of:

in response to receiving a write request for target data, obtaining the target data and an external address of the target data from the write request, the external address being an address unmapped to a storage system, the storage system including a first cache, a second cache, and a mapping layer of a data input/output (I/O) stack, the mapping layer managing a mapping relationship between the external address and an internal address of the storage system;

storing the target data in association with the external address into the first cache in the storage system, the first cache storing user data, the first cache being disposed above the mapping layer of the data I/O stack; and in response to a cache flush request for the first cache, determining the mapping relationship for mapping the external address to the internal address of the storage system, the second cache storing metadata associated with the mapping relationship, the second cache being located between the mapping layer of the data I/O stack and a memory of the storage system;

determining, based on the external address and the mapping relationship, the internal address for storing data in the first cache into a memory of the storage system; and storing the data into the memory of the storage system based on the internal address.

* * * * *